Patented Nov. 13, 1951

2,574,902

UNITED STATES PATENT OFFICE 2,574,902

CHEMICAL PROCESSES AND COMPOSITION

Max F. Bechtold, Kennett Square, Pa., and Omar E. Snyder, Chicago, Ill., assignors to E. I. du Pont de Nemours & Company, Wilmington, Del., a corporation of Delaware No Drawing. Application December 15, 1948, Serial No. 65,536

18 Claims. (Cl. 252—313)

This invention relates to processes for building up the size of particles in aqueous silica sols and to stable sols thereby produced, and is more particularly directed to such processes in which a heel is formed by heating to a temperature above 60° C. an aqueous sol of silica particles of less than 10 millimicrons diameter, a silica sol containing particles of less than 10 millimicrons diameter is added to said heel, and the addition and heating is continued until at least five times as much silica has been added to the heel as was originally present, and is further directed to silica sols, stable against gelation, containing such built-up particles and characterized by having a silica:alkali ratio of from 60:1 to 130:1, by containing discrete silica particles having a molecular weight, as determined by light-scattering, of more than one-half million, by having a relative viscosity, at 10 per cent $SiO_2$, of from 1.15 to 1.55, and, in a preferred embodiment, by containing from 20 to 35 per cent by weight of $SiO_2$.

Historic methods for producing colloidal silica solutions gave products which had little commercial value because of their tendency to gel upon standing. Various methods have been proposed for improving the stability of colloidal silica solutions, such as by dialysing out electrolytes which were thought to contribute instability, but all of these procedures have been slow, tedious, and not adaptable to commercial production. Hence, although a need for colloidal silica solutions has long been recognized, it is only recently that solutions having practical stability have become commercially available.

In United States Patent 2,244,325 issued June 3, 1941, to Paul G. Bird, there is described a process for making colloidal silica solutions by passing alkali metal silicate solutions through ion exchange resins. The method gives a product which is relatively stable even after concentrating to a silica content of from 5 to 15 per cent, and is well adapted to large scale commercial operations. Although the effluent is obtained from the ion exchanger with an $SiO_2$ content of about 3 to 3.5 per cent, the patent states that this effluent may advantageously be evaporated, preferably in a vacuum evaporator, to about one-half its original bulk, and in view of the disclosure of a 15 per cent $SiO_2$ solution it is apparent that such boil-down may be carried still further.

A silica sol having a 15 per cent silica content has only limited usefulness. Thus, while it is very effective as a water treating agent, particularly when produced at or near the point of use, it is a product which is uneconomical to ship by reason of its high water content and it cannot be used where the dilution caused by this water content is objectionable. For instance, when the colloidal silica is to be incorporated into elastomers such as rubber the water content of a 15 per cent solution of silica constitutes a major problem. In this and other uses where the finished product is in substantially dry form the advantages of having a solution of higher solids content than 15 per cent is readily apparent. Furthermore, for the amount of active ingredient involved, a 15 per cent $SiO_2$ solution is definitely uneconomical to ship, handle and store. By doubling the silica content of the solution such costs can be cut almost in half.

Unfortunately, heretofore no method has been known for concentrating colloidal silica solutions much above 15 per cent without serious loss of stability against gelling. The ordinary method which one would expect to use, namely by boiling down as suggested by the Bird patent, results in gelation, sometimes even before the concentrated material can be discharged from the evaporator. The same is true when it is attempted to concentrate silica solutions produced by other methods if the concentration is carried, say, as high as 20 per cent.

Now according to the present invention it has been found that particles in aqueous silica sols can be built up to any desired size and stable sols may thereby be produced by processes comprising forming a heel, by heating to a temperature above 60° C. an aqueous sol of silica particles of less than 10 millimicrons diameter, adding to said heel a silica sol containing particles of less than 10 millimicrons diameter, and continuing the addition and heating until at least 5 times as much silica has been added to the heel as was originally present. By such build-up processes sols may be produced which are amenable to concentration even to as high as 35 per cent $SiO_2$ without gelling, the sols being characterized by having a silica:alkali ratio of from 60:1 to 130:1, by containing discrete silica particles having a molecular weight, as determined by light-scattering, of more than one-half million, by having a relative viscosity, at 10 per cent $SiO_2$, of from 1.15 to 1.55, and in the concentrated form, by containing from 20 to 35 per cent by weight of $SiO_2$.

It is not readily apparent from theoretical considerations that the silica products of the techniques of this invention would be more stable against gelling at high concentrations, and any explanation which might be offered would not be easily susceptible to experimental proof. An explanation which appears to fit the facts is that colloidal silica, such as is prepared from sodium silicate by ion exchange, originally contains particles of relatively low molecular weight and which have a large volume in relation to the $SiO_2$ units contained therein. Upon heating, these particles undergo polymerization and densification. By processes heretofore known, such heating results in gelation of the sol, either immediately or after some concentration has occurred by evaporation of water. However, if the silica:alkali ratio and molecular weight of the starting sol are correctly controlled and if densification of voluminous particles is effected in the presence of particles already densified, by adding a second sol containing the voluminous particles to a first sol containing the already-densified particles, the voluminous particles appear to combine with the densified particles and be densified in combination. The resulting sol thus contains a relatively small number of larger dense particles which have less tendency to unite with each other and hence the sol has less tendency to gel. This theoretical explanation is, of course, not necessary in order to define the invention; suffice it to say that the processes as operated and the products obtained are characteristically different from those heretofore available.

In describing this invention certain of the terms used are capable of more than a single interpretation, and while the terms are here used in their usual and ordinary meanings, the following definitions are given in order to avoid any possible misunderstanding.

The term "silica" includes silicon dioxide, $SiO_2$, in any of its various forms. In aqueous colloidal solutions silica is present in chemical association with various amounts of water. Silica may be regarded as including the family of substances theoretically obtainable by dehydration of orthosilicic acid, $Si(OH)_4$, and the products formable by splitting out water between two or more of such substances. Thus, the dehydration products of orthosilicic acid may be regarded as monomers and the products formed by condensing out water between two or more such monomers are designated as polymers of silica or silicic acid. This condensation reaction occurs spontaneously and may proceed to the point where the polymer has an infinite molecular weight and exists as a gel.

In this description, "silica sols" include colloidal dispersions of silica in aqueous media. Colloidal solutions will be understood to include dispersions in which the size of the silica particles is from 1 to 100 millimicrons. The sols contain particles readily observable by means of an ultramicroscope and may even possess turbidity observable to the unaided eye.

The silica:alkali ratio of from 60:1 to 130:1, which is a limitation upon sols used in and produced by this invention, refers to the weight ratio of total silica, expressed as $SiO_2$, to total alkali, expressed as $Na_2O$. For instance, if the total silica dispersed in a particular sol is 30 per cent $SiO_2$ by weight, and the total alkali is 0.5 per cent $Na_2O$ by weight, the sol has a ratio of 300:5 or 60:1. Such a sol would be within the operable range of ratios covered by the term "from 60:1 to 130:1."

The alkali, although expressed in the ratio as $Na_2O$, may be present as a base of another metal or ammonia. In such a case, the weight of the base actually present is calculated to a weight of $Na_2O$ which is equivalent on the basis of alkalinity. This is a simple molar equivalence; for example, 94 parts by weight of $K_2O$ is equivalent to 62 parts by weight of $Na_2O$. As a practical matter the alkalinity present is easily determined by a volumetric titration with a standard acid, and the acid used is readily calculated to $Na_2O$. Organic bases, such as morpholine, may be expressed as $Na_2O$ by calculation from such a standard acid titration.

The "$SiO_2:Na_2O$ ratio" of a colloidal silica solution, as the term is used herein, means the $SiO_2:Na_2O$ weight ratio.

As the proportion of $SiO_2$ increases in a sodium silicate solution the characteristics of the solution become more those of a silica sol and less of a sodium silicate solution until at a ratio of about 4:1 and above the $SiO_2$ has the predominating influence on the sol characteristics. The present invention, of course, is concerned with sols in which the ratio is upwards of 60:1 and in such sols the alkali constituent is present in such small proportions that the sols may properly be referred to as colloidal silica sols. On the other hand the alkali constituent, though small, is important for its stabilizing action in preventing the gelation of the silica.

The absolute turbidity of a silica sol refers to its turbidity as determined by light scattering. It is expressed as reciprocal centimeters (cm.$^{-1}$) and is determined in a solution containing 1 per cent by weight of $SiO_2$ and is determined by means of a light scattering photometer such as that described by P. P. Debye, Journal of Applied Physics, vol. 17, May, 1946, or the B. S. light scattering photometer of the Phoenix Precision Instrument Company as originally described by Speiser and Brice, Journal of the Optical Society of America, vol. 36, page 364 (1946). The latter instrument was used in determining the value of absolute turbidity for the feed solutions used according to this invention.

When reference is made to the molecular weight of a silica sol as determined by light scattering the molecular weight is, of course, that of the silica particles dispersed in the sol. This molecular weight may vary widely by reason of the condensation reaction referred to above. The molecular weight of the various silica particles may not be at all uniform and when mention is made of "molecular weight" in defining such compositions, the weight average molecular weight is meant.

The weight average molecular weight in silica solutions can be determined by a light scattering method adapted from the method described by Stein and Doty, Journal of the American Chemical Society, 68, 159, (1946). According to the theory of Stein and Doty, the weight-average-molecular-weight, $M_w$, is a function of the turbidity, $\tau$, and the concentration, C, of a polymeric dispersion of solution, according to the following equations:

$$HC/\tau = 1/M_w + 2BC/RT \quad \text{(Equation } a\text{)}$$

where:

C = Concentration of solute in g. solute/cc. of solution.
$M_w$ = Weight-average-molecular-weight of solute in g./mole.
B = Constant, characteristic of the system, which may be determined by osmotic pressure measurements, in erg $x$ cc. of solution/g.$^2$ of solute.
R = Gas constant in erg/mole of solute/degree of temperature.

T = Absolute temperature in degrees.
τ = Turbidity (extinction coefficient for scattering at right angles in cm.$^{-1}$).

$$H = \frac{32\pi^3 n^2 \left(\frac{dn}{dC}\right)^2}{3\lambda^4 N_0} \quad \text{(Equation } b\text{)}$$

$n$ = Refractive index in air of the solution.

$\frac{dn}{dC}$ = Index of refraction gradient between solvent and solution in terms of cc./g.

$\lambda$ = Wave length in air of light used, in cm.

$n_0 = 6.02 \times 10^{23}$ particles/mole (Avogadro's number).

With reference to Figure 1 of the Stein and Doty article, the mercury lamp A serves as the light source which is first rendered monochromatic (5461Å.) by the mounted Corning filters B and then made parallel by a collimating lens C in conjunction with a small 1.5 cm. diaphragm D. Neutral filters to reduce the intensity of the light during the calibration are inserted before the diaphragm instead of in the position E indicated on Figure 1. A semitransparent glass plate E mounted after the green filters reflects a small fraction of the beam through on opalescent glass plate F and thence into the photometer K, to be compared visually with the light scattered at 90° by the solution. A square glass cell G containing the polymer solution is immersed in a water-filled chamber $h$ to reduce reflection at the interfaces, and the water-filled chamber is surrounded by circulating water for temperature control. The light reflected at 90° by the solution is transmitted through a lens J into the other side of the photometer and compared with the standard beam. A cone I absorbs the transmitted light by multiple reflection. Readings are taken directly from the dials M on the photometer.

During calibration only, two neutral filters are inserted to reduce the light intensity of the entire incident beam. The calibration is based either on a magnesium carbonate surface placed at 45° to the incident beam, or on a similarly placed vitrolite surface whose absolute reflectance is known. Readings are taken when matched fields are obtained. The two neutral filters are removed and the block is then replaced by a solution of the polymer of known concentration and again a reading is taken when the fields are matched. The properties of light made it possible to correlate the dial readings obtained during the calibration with the solution values and to obtain values for absolute turbidity.

Values for $n$ and for $$\frac{dn}{dC}$$

are determined separately, and the refractometer used to determine these values should be accurate to the fourth decimal place, since the difference between the refractive index of water and a 1 per cent SiO$_2$ solution ranges from only 0.0007 to 0.0009, depending on the type of silica.

Values for absolute turbidity obtained by the above photometer readings can be treated graphically or by calculation. Concentration $x$ H/turbidity is plotted against concentration for four or five points on a given solution. $M_w$ may be determined by extrapolation of the best straight line drawn visually through these points and use of the intercept in Equation $a$. More accurate values are obtained by calculating the intercept and the slope by, for example, the method of least squares.

The method used for calculating molecular weight from light-scattering data is believed to give molecular weight values which are absolute in the range below about five million. However, as the linear dimensions of a particle become appreciable—say more than one tenth of the wavelength of the light used—interference phenomena necessitate a correction, which is known as the "dissymmetry factor." Rather than use this involved mathematical correction it is preferred to correlate the uncorrected molecular weights with actual particle size as observed directly by means of the electron microscope. For the highly uniform, spherical, dense particles herein dealt with, this correlation is entirely feasible; accordingly it will be understood that when molecular weight values above five million are referred to, the molecular weight values uncorrected for dissymmetry are mean and that these values are related to the actual particle sizes by the following formula:

$$\text{Log}_{10} D = 0.57 \, \text{Log}_{10} M + 1.0$$

where $D$ = particle diameter in millimicrons.
$M$ = weight average molecular weight by light scattering, uncorrected for dissymmetry, expressed in millions.

The figure obtained for the molecular weight by the above-described light scattering technique will be relatively large. It refers to the weight average molecular weight of the particles with respect to their SiO$_2$ content, i. e. on an anhydrous basis. These silica particles may be built up in the form of micelles or agglomerates of smaller, polymeric units. The particles are not, however, in the form of a finely ground or otherwise dispersed gel, but are truly colloidal particles.

The term "relative viscosity" employed in describing this invention is used in its usual and ordinary meaning and refers to the ratio of the viscosity of the solution to the viscosity of the solvent. In this particular case the solution is the silica sol, the solvent is water, and the viscosity is measured at 25° C. on a sol containing 5 or 10 per cent SiO$_2$ by weight as indicated. A sol containing less than 10 per cent SiO$_2$ may be concentrated up to 10 per cent by vacuum evaporation of water at room temperature and a more concentrated sol may be diluted back with water to 5 or 10 per cent for measurement. It will be understood that when reference is made to relative viscosity of 5 or 10 per cent SiO$_2$, this means that the determination is made at 5 or 10 per cent SiO$_2$, but the sol, before adjustment, may contain more or less SiO$_2$ than 5 or 10 per cent.

The viscosity measurements used in determining relative viscosity may be made according to conventional methods provided they are capable of adequate precision. Measurements made with a capillary pipette, for instance, under properly controlled conditions of temperature are adequate for the purpose.

In carrying out a process of this invention a silica sol feed of the specified characteristics is added to a heel consisting of another sol also having specified characteristics and the body of combined sols is heated until its properties are those required for stability at high concentrations, at least five parts by weight of silica as feed having been added for each part of silica originally present in the heel.

The art is already familiar with various ways of making silica sols, and any of these methods which gives a sol of the specified characteristics may be used for preparing the sols to be modified according to this invention. The method selected should give a sol not highly contaminated with electrolytes, as these contribute to subsequent instability. It will be understood however that the alkali which is responsible for the ratio being in the specified range is not to be considered as a deleterious electrolyte. A suitable sol may be prepared by first removing all of the alkali from an alkaline silicate such as sodium silicate and then adding back an amount of alkali necessary to adjust the ratio to the proper range, or the same result may be effected by removing alkali from, say sodium silicate, only sufficiently to leave a sol of the desired ratio.

Among suitable methods for making silica sols are the following:

*By dialysis of sodium silicate.*—The sodium silicate may be neutralized with an acid and the sodium salt formed may be dialyzed out through a semi-permeable membrane.

*From methyl silicate.*—Brimaux, Compt. rend. 98, 105 and 1434 (1884). Methyl silicate is hydrolyzed with water to give a silica sol.

*From silicon tetrachloride.*—Williams, U. S. Patent 1,539,342. Silicon tetrachloride is hydrolyzed with water to give a silica sol.

*From silicon sulfide.*—Fleury, U. S. Patent 61,931. Silicon sulfide is hydrolyzed with water to give a silica sol.

*By electro-osmosis of sodium silicate solution.*—Schwerin, U. S. Patent 1,132,394. A dilute solution of sodium silicate is subjected to electroosmosis, a silica sol being obtained in the anode compartment.

*By the electrolysis of sodium silicate with a mercury cathode.*—Collins, U. S. Patent 1,562,940. By electrolyzing a solution of sodium silicate in a cell fitted with a lead anode and mercury cathode, there is obtained a silica sol.

Obviously, where in the above methods silicic acid is formed by hydrolysis of a silicon compound, it is necessary to remove the by-products, such as methanol, hydrochloric acid, or hydrogen sulfide, in order to obtain a pure silica sol.

While a silica sol prepared by one of the foregoing procedures may be employed as the starting point in a process of this invention, particularly if the sol is freshly prepared, the procedures are subject to a number of objections, such as being slow and being poorly adapted to commercial production, as discussed above.

A process which is subject to none of these objections and which gives a silica sol especially well adapted for use in a process of this invention is that of the Bird Patent 2,244,325 mentioned above. According to this method an alkali metal silicate solution such as sodium silicate is passed through an ion exchange material which removes most of the metal ions and gives a silica sol of the desired $SiO_2:Na_2O$ ratio. Alternatively, all the metal ions may be removed, in which case the sol may then be adjusted to the desired ratio by adding the requisite amount of sodium silicate or sodium hydroxide solution. In making such adjustment the sol should not be permitted to remain long in the pH range of 5 to 7 since in this range it is unstable.

The fresh effluent from an ion exchange process of the Bird patent, with the ratio suitably adjusted as just described, is ideally adapted for modification by a process of this invention. The absolute turbidity is substantially less than 0.0226 cm.$^{-1}$ at 1 per cent $SiO_2$ with 547 millimicron wavelength light, and the relative viscosity, at 5 per cent $SiO_2$, is more than 1.29. This sol is therefore suitable for adding to the second sol. The first sol will hereinafter be referred to as "feed" and the sol to which it is added will be referred to as "heel." This terminology is derived from the practical application of the processes in an evaporator, where the second sol is the "heel" present in the evaporator and the first sol is the "feed" added thereto.

The silica content of the feed may be as high as it is feasible to make within the specification stated. The feed must not, of course, be a gel. The customary processes of making silica sols tend to give gels as the concentration of silica increases, and accordingly caution should be observed to keep the silica content down to where no gelling occurs. With silica sols prepared by ion-exchange a feed containing from 2 to 6 per cent $SiO_2$ is entirely feasible, and more particularly, a feed containing about 2.5 per cent $SiO_2$ is especially satisfactory.

The size of silica particles in the feed sol and in the sol which is heated to make the heel should be less than 10 millimicrons in diameter. Particles of this size range may be observed by means of an electron microscope. In determining the size of silica particles by the electron microscope there is some densification effected in the preparation of the sample. This is minimized by drying the sample at room temperature, under vacuum. Thus, the particle size limitation of 10 millimicrons referred to in the description of this invention is the size of particle as observed on an electron microscope on a sample originally containing 0.25 per cent $SiO_2$ in water and dried at 25° C. under vacuum.

The heel may be prepared by heating a portion of the feed for a time sufficient to lower the viscosity to the desired point. It should be noted that in describing this invention the relative viscosity of the feed is specified at 5 per cent $SiO_2$ whereas the relative viscosity of the heel is specified at 10 per cent $SiO_2$. A sol having a relative viscosity more than 1.29 at 5 per cent has a relative viscosity of more than 1.60 at 10 per cent. The rate at which the feed is converted to a suitable heel is proportional to the temperature; that is, the higher the temperature, the faster the conversion takes place. Superheating, under pressure, may be employed, but for most practical purposes the rate of conversion at or about the boiling temperature is sufficiently rapid. It is preferred to heat to a temperature above about 60° C. in any event.

The heating at this point should not be continued too long, because simultaneously with lowering of viscosity there is an increase in molecular weight, and unduly prolonged heating will cause the molecular weight to exceed the fifty million, as determined by light scattering, which is the upper limit of molecular weight for the silica in the heel.

When the relative viscosity of the heel has been reduced to from 1.15 to 1.60 measured at 10 per cent $SiO_2$, addition of fresh feed sol may be started. The heating is continued and the fresh sol is fed in at such a rate that the relative viscosity of the combined sols is maintained in the range from 1.15 to 1.55 measured at 10 per cent $SiO_2$. The correct rate of feed for a given set of conditions may be determined readily by drawing off a sample of the combined sols, adjusting it to 10 per cent $SiO_2$, and determining the relative viscosity, or by determining the relative viscosity of the combined sols at the silica content present and calculating the value at 10 per cent $SiO_2$ by extrapolation from a previously determined curve of silica concentration plotted against relative viscosity.

The addition of the feed sol is continued until at least 5 parts by weight of $SiO_2$ have been added per part of $SiO_2$ originally present in the heel. The proportion of silica so added may be in excess of 5 parts for each original part. Thus, when it is desired to concentrate a sol from 2 per cent $SiO_2$ to 30 per cent $SiO_2$ without loss of volume, the proportion added is 14 to one.

The combined sols are heated in a process of this invention, preferably above about 60° C., and it is especially preferred to heat at or above the normal boiling temperature. The heating may be accompanied by evaporation of water, or may be carried out under pressure or reflux so that no water is lost. Such heating may then be followed by concentration of the sol in any desired manner, such as by atmospheric evaporation, vacuum evaporation, or electrodecantation or similar techniques. The molecular weight of the silica particles increases during heating and produces a sol which is not only more stable against gelling at the existing concentration of $SiO_2$ but is amenable to concentration without gelling.

The heating of the small silica particles of the feed sol in the presence of the larger silica particles in the heel effects a build-up of the smaller particles upon the larger. This build-up produces a family of new silica particles which are substantially spherical in shape, surprisingly dense for particles of non-igneous origin, and remarkably uniform in size. When the build-up process is continued long enough the particle size (as directly observed by electron micrographs) increases into the range of 15 to 130 millimicrons average diameter. Even with particles in this size range the sols are stable against gelling.

In a preferred aspect of this invention the heating of the combined sols is accompanied by evaporation of water. Ideally, this is accomplished by evaporation at constant volume; that is, the water is evaporated off at a constant value. This constant volume evaporation may be continued until the concentration of $SiO_2$ in the sol is at any desired figure, which may even be in excess of 30 per cent $SiO_2$. When it is considered that the effluent from the ion exchanger may contain as little as about 2 per cent $SiO_2$ it will be seen that such concentration represents a manyfold increase in the amount of silica present per unit volume of sol. Such an increase in concentration would be impossible without gelling, were it not for the densification and growth of the particles effected by the heating, as indicated by the decrease in relative viscosity.

In another preferred embodiment of this invention the heating is carried out while maintaining the relative viscosity of the combined sols in the range from 1.15 to 1.55 at 10 per cent $SiO_2$ by suitable control of the rates of adding feed and of heating, as above, but a portion of the combined sol body is continuously withdrawn, after reaching the proper relative viscosity. Water may be simultaneously evaporated. The rates of feeding fresh sol, evaporating water, and drawing off product may be so adjusted as to maintain the volume of the combined sol body substantially constant. This process gives a product of much higher molecular weight, but which is nevertheless characterized by having a relative viscosity, measured at 10 per cent $SiO_2$, of from 1.15 to 1.55 and by being stable against gelling even when concentrated above about 30 per cent $SiO_2$.

It will be understood that the heating of the combined heel and feed sols may be commenced immediately, and it is especially advantageous to heat the heel about to the boiling point before adding the feed sol and continue such heating during the addition. This method of operation facilitates holding the volume constant.

The heating may be carried out in any suitable apparatus, the art being well acquainted with the design of apparatus of this type and particularly with efficient designs for rapid evaporation of water. Vacuum evaporators may be used, but the vacuum should not be so high as to lower the temperature to a point where the heating time is unduly prolonged.

A silica sol produced by a process of this invention is characterized by having a silica:alkali ratio of from 60:1 to 130:1 and preferably by having a ratio of from 70:1 to 100:1. It contains discrete silica particles having a molecular weight, as determined by light scattering, of more than one-half million. The product has a relative viscosity, as measured at 10 per cent $SiO_2$, of from 1.15 to 1.55. In a particularly useful aspect of the invention the product contains from 20 to 35 per cent by weight of $SiO_2$.

The silica sols of this invention are useful in a variety of purposes. They are unique in that even at 20 to 35 per cent by weight $SiO_2$ they are indefinitely stable against gelling at ordinary temperatures and are stable for at least one month against gelling at 95° C. By reason of their high concentration they are well adapted for such purposes as incorporation into elastomers such as rubber, but even when diluted they are highly useful for such purposes as improving the slip resistance of coatings made from wax emulsions containing them. Such use in wax emulsions is disclosed and claimed in co-pending application Serial No. 775,375, filed September 20, 1947, by Ralph K. Iler.

The invention will be better understood by reference to the following illustrative examples:

*Example 1*

A silica sol having an $SiO_2:Na_2O$ weight ratio of 80:1 was made up by passing a dilute solution of sodium silicate having a 3.25:1 ratio through a bed of an ion-exchange resin in the hydrogen form. The sol contained 3.86 per cent $SiO_2$ by weight, had an absolute turbidity of less than .0226 cm.$^{-1}$ at 1 per cent $SiO_2$ with 547 millimicron wavelength light, and a relative viscosity at 5 per cent $SiO_2$ of more than 1.29.

A heel was made by heating this silica sol for 1½ hours under reflux. At the end of this time the heel had a relative viscosity in the range of from 1.15 to 1.60 at 10 per cent $SiO_2$, and the silica particles had a molecular weight of less than fifty million as determined by light scattering. The $SiO_2:Na_2O$ ratio remained at 80:1.

To 200 parts by volume of this heel there was added 1000 parts by volume of the original sol. The addition was made at a uniform rate over a period of 3½ hours, and the body of combined sols was maintained at its boiling temperature, evaporated water being returned as reflux.

The product thus obtained was a stable silica sol which had not gelled after standing for 5 months at ordinary temperatures. The molecular weight of the silica was 3,700,000 as determined by light scattering, and the relative viscosity at 10 per cent $SiO_2$ was in the range from 1.15 to 1.55. This product was suitable for concentration to 20 per cent $SiO_2$ or above, without gelling.

In contrast a product made in a similar manner except that the feed was heated under reflux for 1½ hours before adding to the heel, had a molecular weight, by light scattering, of only 820,000. In this case the relative viscosity of the feed, at 5 per cent $SiO_2$, was less than 1.29. This product was not suitable for concentration to 20 per cent $SiO_2$ without gelling.

*Example 2*

A silica sol containing 3 per cent by weight of silica and having an $SiO_2:Na_2O$ ratio of 87:1, an absolute turbidity of less than 0.0226 cm.$^{-1}$ at 1 per cent $SiO_2$ with 547 millimicron wavelength light, and a relative viscosity at 5 per cent $SiO_2$ of more than 1.29 was made by passing a dilute solution of sodium silicate having a 3.25 ratio through a bed of an ion-exchange resin in the hydrogen form.

A two hundred part by volume portion of this sol was heated to boiling under reflux, and to the heel so produced was added gradually, over a period of 4 hours, 1800 parts by volume of the original sol, the boiling under reflux being continued during this time. This rate of feed maintained the relative viscosity in the range from 1.15 to 1.55 at 10 per cent $SiO_2$.

The sol thus obtained was turbid, indicating the presence of silica particles of high molecular weight. The concentration fo silica in the sol was increased to 17 per cent $SiO_2$ by evaporating off water under vacuum. The concentrated sol so obtained was relatively stable against gelling, being ungelled after several months storage at room temperature. The $SiO_2:Na_2O$ ratio was the same as the original sol.

*Example 3*

This example illustrates the cyclic operation of a process of this invention.

A sodium silicate solution, having a 3.25 $SiO_2:Na_2O$ weight ratio and having a specific gravity of 40.6° Bé. was pumped from a storage tank to a scale tank. The scale tank was equipped with an interlock switch which shut off the pump when the required amount had been fed to the tank. The weighed charge from the scale tank was then fed to a dilution tank which already contained the desired quantity of water recycled from the ion-exchanger wash operation (which will be described later) and the solution was agitated. In this operation the strength of the dilute silicate solution was adjusted to from 2.0 to 2.4 per cent $SiO_2$.

In the next operation the sodium ion was completely removed from the dilute sodium silicate solution leaving a dilute solution of silicic acid, that is, a silica sol. This was accomplished by pumping the contents of the dilution tank through one of two ion-exchangers. Control of the flow was obtained by means of a rotameter and an automatic shut-off meter. The initial step involved displacement to the sewer of the water in the ion-exchanger by the silicate solution. When a volume of silicate solution had passed through the meter equivalent to the contents of the ion exchanger the flow was automatically shut off. The valves were then manipulated so that the effluent was directed to one of two dilute silica effluent tanks and the meter reset to permit the flow of the remainder of the idlute silicate batch to the ion exchanger. Water was then fed to the ion exchanger through another rotameter and the same meter as previously used. Again the meter was set to permit the volume displacement of the ion exchanger's contents. When the meter cut off the flow of water, the valves were reset to direct the water effluent to the dilution tank and the amount of water required in the dilution step mentioned above was passed through the unit. After each dilute silicate batch had been deionized, it was necessary to regenerate the ion exchange resin (Nalcite HCR), which operation will next be described.

The initial step in the regeneration operation was to set the valves so that the effluent from the ion exchanger flowed to the sewer. The required amount of water was then metered into the unit. At the same time additional water was introduced through rotary hydraulic jets located just above the resin bed to assist in breaking up any caking which might have occurred. This preliminary wash purged the unit of any silicate solution whch on contact with the acid to be introduced next would have gelled. Obviously the formation of any such gel in the ion exchanger would be undesirable. For the regeneration, concentrated commercial sulfuric acid was diluted to approximately 10 per cent $H_2SO_4$ in an acid dilution tank which already containtd the calculated amount of water to provide a 10 per cent $H_2SO_4$ solution. Agitation was obtained by the use of an air sparger. The outlet valves from the ion exchanger were then set to direct the flow to the sewer by way of a neutralizing tank where the pH of the acidic waste was automatically adjusted to neutrality by the controlled addition of caustic soda. Then the diluted sulfuric acid was introduced to the ion exchanger by means of a water eductor which further cut the acidity of the acid to approximately 3 per cent $H_2SO_4$. After the contents of the acid dilution tank had been fed to the ion exchanger, the unit was thoroughly flushed out with water. During this last washing step the flow from the ion exchanger was so directed that a sufficient quantity of the effluent went to the acid dilution tank to prepare the next batch of 10 per cent acid after which the balance was directed to the neutralizing tank and thence to the sewer.

In the meantime the effluent silicic acid in the effluent tank was adjusted to the desired $SiO_2:Na_2O$ ratio by the addition of sodium silicate solution from the scale tank. It was then pumped into an evaporator which was of the atmospheric, constant volume type. Here the material was concentrated to 30 per cent $SiO_2$ content and it was then pumped to a product tank for analysis. The evaporator was equipped with a thermojet compressor which utilized some of the waste heat from the evaporation.

The effluent going into the evaporator had an $SiO_2:Na_2O$ weight ratio of 85:1. The effluent had a relative viscosity, as measured at 5 per cent $SiO_2$, of more than 1.29. The volume of the evaporator was about one-third of the volume of each dilute silica effluent tank and in order to concentrate to 30 per cent $SiO_2$, three dilute silica effluent tankfuls were used. The ratio of silica added as feed to that present in the tank as the original heel was therefore 8:1. The boiling of the original evaporatorful of silica sol gave a heel which had a relative viscosity, as measured at 10 per cent $SiO_2$, of from 1.15 to 1.60, and the relative viscosity of the final product, as measured at 10 per cent $SiO_2$, was from 1.15 to 1.55. The effluent fed to the evaporator was water-clear and had an absolute turbidity of less than 0.0226 cm.$^{-1}$ at 1 per cent $SiO_2$ with 547 millimicron wavelength light. The heel had a molecular weight as determined by light scattering of less than two million and the final product had a molecular weight as determined by light scattering of from 1 to 2 million.

*Example 4*

A silica sol having an $SiO_2:Na_2O$ weight ratio of 78.4:1 was made by passing a dilute solution of sodium silicate having a 3.25:1 ratio through a bed of an ion exchange resin in the hydrogen form. The sol contained 2.2 per cent $SiO_2$ by weight, had an absolute turbidity of less than 0.0226 cm.$^{-1}$ at 1 per cent $SiO_2$ with 547 millimicron wavelength light, and a relative viscosity at 5 per cent $SiO_2$ of more than 1.29.

A portion of this sol was placed in an evaporator and was heated to boiling over a period of 20 minutes at atmospheric pressure. The evaporator was equipped with a constant level feed device which maintained the volume of liquid in the evaporator at a constant value. After 20 minutes of heating evaporation of water was started and to the heat-treated heel in the evaporator fresh silica sol was added as required to keep the volume constant. Evaporation and feeding was continued until the product in the evaporator contained 30.23 per cent $SiO_2$ by weight. The evaporation time was about 6 hours.

The product obtained was stable against gelling for 6 months at room temperature and 54 days at 95° C. The silica:alkali ratio was 78:1. The relative viscosity of the product, at 10 per cent $SiO_2$, was in the range from 1.15 to 1.55 and the molecular weight of the silica particles in the product, as determined by light scattering, was more than one-half million.

*Example 5*

A silica sol was prepared by the ion exchange procedure described in Example 4 having the same characteristics except that the silica content was 2 per cent $SiO_2$ and the ratio was 70.2:1.

In an atmospheric evaporator this solution was heated and boiled down until the $SiO_2$ content was 30 per cent by weight. The heel thus obtained had a molecular weight of less than 2 million as determined by light scattering and a relative viscosity of from 1.15 to 1.60 at 10 per cent $SiO_2$. The addition of fresh 2 per cent $SiO_2$ sol was then started and a continuous withdrawal of product was made, the rate of feeding fresh sol and of withdrawing product being so related that the volume in the evaporator remained substantially constant and the loss of water by evaporation was sufficient to keep the concentration of silica in the evaporator at about 30 per cent. This manner of operation was continued for a total of 11 hours.

The product obtained had an average silica content of 28.1 per cent by weight, a molecular weight, by light scattering, of 1.9 million, an $SiO_2:Na_2O$ weight ratio of 72:1 and a relative viscosity, at 10 per cent $SiO_2$, in the range from 1.15 to 1.55. The product was stable against gelling at 95° C. for more than 5 months and was stable indefinitely at room temperature.

We claim:

1. A process comprising building up the size of particles in an aqueous silica sol from less than 10 millimicrons to a larger size, the maximum size being 130 millimicrons, by forming a heel by heating at from 60° C. to about the boiling temperature at atmospheric pressure an aqueous sol of silica particles of less than 10 millimicrons diameter, the heel, after heating, having a relative viscosity of from 1.15 to 1.60 at 10% $SiO_2$, adding to said heel a silica sol containing particles of less than 10 millimicrons diameter, and continuing the addition and heating until at least 5 times as much silica has been added to the heel as was originally present.

2. A process comprising building up the size of particles in an aqueous silica sol from less than 10 millimicrons to a larger size, the maximum size being 130 millimicrons, by forming a heel by heating at from 60° C. to about the boiling temperature at atmospheric pressure an aqueous sol of silica particles of less than 10 millimicrons diameter, the heel, after heating, having a relative viscosity of from 1.15 to 1.60 at 10% $SiO_2$, adding to said heel a silica sol containing particles of less than 10 millimicrons diameter, and continuing the addition and heating until the silica particles in the sol have grown to at least 15 millimicrons diameter.

3. A process comprising building up the size of particles in an aqueous silica sol from less than 10 millimicrons to a larger size, the maximum size being 130 millimicrons, by forming a heel by heating at from 60° C. to about the boiling temperature at atmospheric pressure an aqueous sol of silica particles of less than 10 millimicrons diameter, the heel, after heating, having a relative viscosity of from 1.15 to 1.60 at 10% $SiO_2$, adding to said heel a silica sol containing particles of less than 10 millimicrons diameter, while maintaining the pH in the range from 9 to 11, and continuing the addition and heating until the silica particles in the sol have grown to at least 15 millimicrons diameter.

4. A process comprising building up the size of particles in an aqueous silica sol from less than 10 millimicrons to a larger size, the maximum size being 130 millimicrons, by forming a heel by heating at from 60° C. to about the boiling temperature at atmospheric pressure an aqueous sol of silica particles of less than 10 millimicrons diameter, said heel having a silica:alkali ratio of from 60:1 to 130:1, a particle molecular weight of less than fifty million as determined by light scattering, and a relative viscosity of from 1.15 to 1.60 at 10 per cent $SiO_2$, adding to said heel an aqueous silica sol containing particles of less than 10 millimicrons diameter, having a silica:alkali ratio of from 60:1 to 130:1, an absolute turbidity of less than 0.0226 cm.$^{-1}$ at 1 per cent $SiO_2$ with 547 millimicron wavelength light, and a relative viscosity, at 5 per cent $SiO_2$, of more than 1.29, heating the combined sols to from 60° C. to about the boiling temperature at atmospheric pressure, and continuing the addition and heating until the weight of $SiO_2$ added is at least five times that originally present.

5. A process comprising building up the size of particles in an aqueous silica sol from less than 10 millimicrons to a larger size, the maximum size being 130 millimicrons, by forming a heel by heating at from 60° C. to about the boiling temperature at atmospheric pressure an aqueous sol of silica particles of less than 10 millimicrons diameter, said heel having a silica:alkali ratio of from 60:1 to 130:1, a particle molecular weight of less than fifty million as determined by light scattering, and a relative viscosity of from 1.15 to 1.60 at 10 per cent $SiO_2$, adding to said heel an aqueous silica sol containing particles of less than 10 millimicrons diameter, having a silica:alkali ratio of from 60:1 to 130:1, an absolute turbidity of less than 0.0226 $cm.^{-1}$ at 1 per cent $SiO_2$ with 457 millimicron wavelength light, and a relative viscosity, at 5 per cent $SiO_2$, of more than 1.29, heating the body of combined sols to from 60° C. to about the boiling temperature at atmospheric pressure and evaporating water therefrom, and continuing the addition, heating and evaporation until the weight of $SiO_2$ added is at least five times that originally present, the rate of evaporation being so related to the rate of addition of fresh sol as to maintain the volume of the combined sol body substantially constant.

6. A process comprising building up the size of particles in an aqueous silica sol from less than 10 millimicrons to a larger size, the maximum size being 130 millimicrons, by forming a heel by heating at from 60° C. to about the boiling temperature at atmospheric pressure an aqueous sol of silica particles of less than 10 millimicrons diameter, said heel having a silica:alkali ratio of from 60:1 to 130:1, a particle molecular weight of less than fifty million as determined by light scattering, and a relative viscosity of from 1.15 to 1.60 at 10 per cent $SiO_2$, adding to said heel an aqueous silica sol containing particles of less than 10 millimicrons diameter, having a silica:alkali ratio of from 60:1 to 130:1, an absolute turbidity of less than 0.0226 $cm.^{-1}$ at 1 per cent $SiO_2$ with 547 millimicron wavelength, light, and a relative viscosity, at 5 per cent $SiO_2$, of more than 1.29, heating the combined sols to from 60° C. to about the boiling temperature at atmospheric pressure until the relative viscosity is from 1.15 to 1.55 at 10 per cent $SiO_2$, withdrawing a portion of the sol body so produced, adding to the remaining sol body a silica sol having a ratio, absolute turbidity, and relative viscosity within the ranges specified for the sol originally added, heating the combined sols from 60° C. to about the boiling temperature at atmospheric pressure, continuing the heating, and continuing the addition at such a rate that the relative viscosity of the combined sols is maintained in the range from 1.15 to 1.55 at 10 per cent $SiO_2$ until the total weight of $SiO_2$ added is at least five times that originally present.

7. A process comprising building up the size of particles in an aqueous silica sol from less than 10 millimicrons to a larger size, the maximum size being 130 millimicrons, by forming a heel by heating at from 60° C. to about the boiling temperature at atmospheric pressure an aqueous sol of silica particles of less than 10 millimicrons diameter, said heel having a silica:alkali ratio of from 60:1 to 130:1, a particle molecular weight of less than fifty million as determined by light scattering, and a relative viscosity of from 1.15 to 1.60 at 10 per cent $SiO_2$, adding to said heel an aqueous silica sol containing particles of less than 10 millimicrons diameter, having a silica:alkali ratio of from 60:1 to 130:1, an absolute turbidity of less than 0.0226 $cm.^{-1}$ at 1 per cent $SiO_2$ with 547 millimicron wavelength light, and a relative viscosity, at 5 per cent $SiO_2$, of more than 1.29, heating the combined sols to from 60° C. to about the boiling temperature at atmospheric pressure until the relative viscosity is from 1.15 to 1.55 at 10 per cent $SiO_2$, withdrawing a portion of the sol body so produced, adding to the remaining sol body a silica sol having a ratio, absolute turbidity, and relative viscosity within the ranges specified for the sol originally added, heating the combined sols to from 60° C. to about the boiling temperature at atmospheric pressure, continuing the heating, and continuing the addition at such a rate that the relative viscosity of the combined sols is maintained in the range from 1.15 to 1.55 at 10 per cent $SiO_2$ until silica particles in finely divided form precipitate.

8. In a process for modifying a silica sol by building up the size of particles therein from less than 10 millimicrons to a larger size, the maximum size being 130 millimicrons, the steps comprising adding an aqueous silica sol prepared by removing metal ions from an aqueous metal silicate solution with an acid-treated ion-exchange material and having a silica:alkali ratio of from 60:1 to 130:1, an absolute turbidity of less than 0.0226 $cm.^{-1}$ at 1 per cent $SiO_2$ with 547 millimicron wavelength light, and a relative viscosity, at 5 per cent $SiO_2$, of more than 1.29, to another aqueous silica sol similarly prepared and then heated to from 60° C. to about the boiling temperature at atmospheric pressure, the sol after heating having a silica:alkali ratio of from 60:1 to 130:1, a molecular weight of less than fifty million as determined by light scattering, and a relative viscosity of from 1.15 to 1.60 at 10 per cent $SiO_2$, and heating the combined sols at from 60° C. to about the boiling temperature at atmospheric pressure, the addition being continued at such a rate that the relative viscosity of the combined sols is maintained in the range from 1.15 to 1.55 at 10 per cent $SiO_2$ and until the weight of $SiO_2$ added is at least five times that originally present.

9. In a process for modifying a silica sol by building up the size of particles therein from less than 10 millimicrons to a larger size, the maximum size being 130 millimicrons, the steps comprising adding an aqueous silica sol having a silica:alkali ratio of from 60:1 to 130:1, an absolute turbidity of less than 0.0226 $cm.^{-1}$ at 1 per cent $SiO_2$ with 547 millimicron wavelength light, and a relative viscosity, at 5 per cent $SiO_2$, of more than 1.29, to another aqueous silica sol having a silica:alkali ratio of from 60:1 to 130:1, a molecular weight of less than fifty million as determined by light scattering, and a relative viscosity of from 1.15 to 1.60 at 10 per cent $SiO_2$, and heating the combined sols at from 60° C. to about the boiling temperature at atmospheric pressure until the relative viscosity is from 1:15 to 1.55 at 10 per cent $SiO_2$, continuously withdrawing a portion of the sol body as produced, continuously adding to the remaining sol body a silica sol having a ratio, absolute turbidity, and relative viscosity within the ranges specified for the sol originally added, heating the body of combined sols at from 60° C. to about the boiling temperature at atmospheric pressure and evaporating water therefrom, the addition being continued at such a rate that the relative viscosity of the combined sols is maintained in the range from 1.15 to 1.55 at 10 per cent $SiO_2$ and until the total weight of $SiO_2$ added is at least five times that originally present, and the rates of evaporation and withdrawal being so related to the rate of addition of fresh sol as to maintain the volume of the combined sol body substantially constant.

10. In a process for modifying a silica sol by building up the size of particles therein from less than 10 millimicrons to a larger size, the maximum size being 130 millimicrons, the steps comprising adding an aqueous silica sol prepared by removing metal ions from an aqueous metal silicate solution with an acid-treated ion-exchange material and having a silica:alkali ratio of from 60:1 to 130:1, an absolute turbidity of less than 0.0226 cm.$^{-1}$ at 1 per cent SiO$_2$ with 547 millimicron wavelength light, and a relative viscosity, at 5 per cent SiO$_2$, of more than 1.29, to another aqueous silica sol similarly prepared and then heated to from 60° C. to about the boiling temperature at atmospheric pressure, the sol after heating having a silica:alkali ratio of from 60:1 to 130:1, a molecular weight of less than fifty million as determined by light scattering, and a relative viscosity of from 1.15 to 1.60 at 10 per cent SiO$_2$, and heating the body of combined sols at from 60° C. to about the boiling temperature at atmospheric pressure and evaporating water therefrom, the addition being continued at such a rate that the relative viscosity of the combined sols is maintained in the range from 1.15 to 1.55 at 10 per cent SiO$_2$, and until the weight of SiO$_2$ added is at least five times that originally present, and the rate of evaporation being so related to the rate of addition of fresh sol as to maintain the volume of the combined sol body substantially constant.

11. In a process for modifying a silica sol by building up the size of particles therein from less than 10 millimicrons to a larger size, the maximum size being 130 millimicrons, the steps comprising boiling an aqueous silica sol, freshly prepared by removing sodium ions from sodium silicate solution with an acid-treated ion-exchange material and having an SiO$_2$:Na$_2$O ratio of from 70:1 to 100:1 and an SiO$_2$ content from 2 to 6 per cent, until its relative viscosity is from 1.15 to 1.60 at 10 per cent SiO$_2$, continuously adding more of the original silica sol while boiling the body of combined sols to evaporate water therefrom, the rate of sol addition being equal to the rate of evaporation and being such as to maintain the relative viscosity of the combined sol body in the range from 1.15 to 1.55 and the addition and evaporation being continued until the sol contains from 20 to 35 per cent SiO$_2$.

12. In a process for modifying a silica sol by building up the size of particles therein from less than 10 millimicrons to a larger size, the maximum size being 130 millimicrons, the steps comprising boiling an aqueous silica sol, freshly prepared by removing sodium ions from sodium silicate solution with an acid-treated ion-exchange material and having an SiO$_2$:Na$_2$O ratio of about 85:1 and an SiO$_2$ content of about 2.5 per cent, until its relative viscosity is from 1.15 to 1.60 at 10 per cent SiO$_2$, continuously adding more of the original silica sol while boiling the body of combined sols to evaporate water therefrom, the rate of sol addition being equal to the rate of evaporation and being such as to maintain the relative viscosity of the combined sol body in the range from 1.15 to 1.55 and the addition and evaporation being continued until the sol contains about 30 per cent SiO$_2$.

13. An aqueous, stable silica sol characterized by having a silica:alkali ratio of from 60:1 to 130:1, by containing discrete silica particles having a molecular weight, as determined by light scattering, of more than one-half million, by having a relative viscosity, at 10 per cent SiO$_2$, from 1.15 to 1.55, and by containing from 20 to 35 per cent by weight of SiO$_2$.

14. An aqueous, stable silica sol characterized by having a silica:Na$_2$O ratio of from 70:1 to 100:1, by containing discrete silica particles having a molecular weight, as determined by light scattering, of more than one-half million, by having a relative viscosity, at 10 per cent SiO$_2$, from 1.15 to 1.55, and by containing from 20 to 35 per cent by weight of SiO$_2$.

15. An aqueous, stable silica sol characterized by having a silica:Na$_2$O ratio of from 70:1 to 100:1, by containing discrete silica particles having a molecular weight, as determined by light scattering, of from ½ to 90 million, by having a relative viscosity, at 10 per cent SiO$_2$, from 1.15 to 1.55, and by containing from 20 to 35 per cent by weight of SiO$_2$.

16. A process comprising building up the size of particles in an aqueous silica sol by heating to from 60° C. to about the boiling temperature at atmospheric pressure a heel consisting of an aqueous sol of silica particles, the sol, after heating, having a relatively viscosity of from 1.15 to 1.60 at 10% SiO$_2$, adding to said heel a silica sol containing particles of less than 10 millimicrons diameter, and continuing the addition and heating until at least 5 times as much silica has been added to the heel as was originally present.

17. A process comprising building up the size of particles in an aqueous silica sol by heating to from 60° C. to about the boiling temperature at atmospheric pressure a heel consisting of an aqueous sol of silica particles, the sol, after heating, having a relative viscosity of from 1.15 to 1.60 at 10% SiO$_2$, adding to said heel a silica sol containing particles of less than 10 millimicrons diameter, and continuing the addition and heating until the silica particles in the sol have an average diameter of at least 15 millimicrons.

18. A process comprising building up the size of particles in an aqueous silica sol by heating to from 60° C. to about the boiling temperature at atmospheric pressure a heel consisting of an aqueous sol of silica particles, the sol, after heating, having a relative viscosity of from 1.15 to 1.60 at 10% SiO$_2$, adding to said heel a silica sol containing particles of less than 10 millimicrons diameter, while maintaining the pH of the mixture in the range from 9 to 11, and continuing the addition and heating until at least 5 times as much silica has been added to the heel as was originally present.

MAX F. BECHTOLD.
OMAR E. SNYDER.

REFERENCES CITED

The following references are of record in the file of this patent:

UNITED STATES PATENTS

| Number | Name | Date |
| --- | --- | --- |
| 2,244,325 | Bird | June 3, 1941 |
| 2,386,337 | Moyer | Oct. 9, 1945 |
| 2,457,971 | Voorhees | Jan. 4, 1949 |

OTHER REFERENCES

Alexander: "Colloid Chem.," vol. VI, pages 1113–1117 (1946).